US009460574B2

(12) United States Patent
Stagg

(10) Patent No.: US 9,460,574 B2
(45) Date of Patent: Oct. 4, 2016

(54) BLUETOOTH ZONE CONTROL USING PROXIMITY DETECTION

(71) Applicant: Laird Technologies, Inc., Earth City, MO (US)

(72) Inventor: David Stagg, Flat Rock, NC (US)

(73) Assignee: Laird Technologies, Inc., Earth City, MO (US)

( * ) Notice: Subject to any disclaimer, the term of this patent is extended or adjusted under 35 U.S.C. 154(b) by 233 days.

(21) Appl. No.: 14/331,759

(22) Filed: Jul. 15, 2014

(65) Prior Publication Data

US 2016/0019737 A1 Jan. 21, 2016

(51) Int. Cl.
G05B 19/00 (2006.01)
G07C 9/00 (2006.01)
H04W 4/00 (2009.01)

(52) U.S. Cl.
CPC .......... *G07C 9/00111* (2013.01); *H04W 4/008* (2013.01)

(58) Field of Classification Search
None
See application file for complete search history.

(56) References Cited

U.S. PATENT DOCUMENTS

| | | | |
|---|---|---|---|
| 4,247,908 A | 1/1981 | Lockhart, Jr. et al. | |
| 4,980,626 A * | 12/1990 | Hess | B25J 9/1005 250/559.33 |
| 7,915,841 B2 * | 3/2011 | Griessnig | F16P 3/14 235/472.02 |
| 8,874,256 B2 * | 10/2014 | Mylet | B65G 67/06 340/5.54 |
| 8,994,492 B2 * | 3/2015 | Farhan | G05B 23/0278 340/10.4 |
| 9,165,232 B2 * | 10/2015 | Glidden, III | G06K 19/0717 |
| 2006/0122730 A1 * | 6/2006 | Niemela | B25J 9/1612 700/245 |
| 2007/0061040 A1 * | 3/2007 | Augenbraun | A47L 5/225 700/245 |
| 2008/0039974 A1 * | 2/2008 | Sandin | G05D 1/028 700/258 |
| 2008/0214100 A1 | 9/2008 | Walker et al. | |
| 2009/0033269 A1 * | 2/2009 | Griessnig | F16P 3/14 318/563 |
| 2009/0065578 A1 | 3/2009 | Peterson et al. | |
| 2009/0108989 A1 * | 4/2009 | Sinclair | B60R 25/045 340/5.62 |
| 2009/0117846 A1 | 5/2009 | Mavrakakis | |
| 2010/0026484 A1 * | 2/2010 | King | A63G 7/00 340/539.11 |

(Continued)

FOREIGN PATENT DOCUMENTS

KR 10-2012-0117315 10/2012

OTHER PUBLICATIONS

International Search Report and Written Opinion dated Oct. 13, 2015 for PCT International App. No. PCT/US2015/037942 filed Jun. 26, 2015 which claims priority to the instant application; 14 pages.
www.electronics-eetimes.com; by Julien Happich; Bluetooth beacons nowhere precise enough, says BeSpoon; Nov. 2014; 1 page.

*Primary Examiner* — Ojiako Nwugo
(74) *Attorney, Agent, or Firm* — Harness, Dickey, & Pierce, P.L.C

(57) ABSTRACT

According to various aspects, exemplary embodiments are disclosed of a Bluetooth zone control system. In an exemplary embodiment, a Bluetooth zone control system generally includes a first Bluetooth device configured to provide a first Bluetooth signal. A location of the first Bluetooth device corresponds to a location of a machine. The system also includes an operator control unit having a second Bluetooth device configured to detect the first Bluetooth signal. The operator control unit is configured to control the machine based on first authorization rights when the second Bluetooth device detects the first Bluetooth signal at or above a signal threshold, and to control the machine based on second authorization rights when the second Bluetooth device does not detect the first Bluetooth signal at or above the signal threshold.

20 Claims, 3 Drawing Sheets

(56) References Cited

U.S. PATENT DOCUMENTS

| | | | |
|---|---|---|---|
| 2010/0127824 A1* | 5/2010 | Moschl | G05B 19/4184 340/5.65 |
| 2011/0072542 A1* | 3/2011 | Shaw | C07K 14/415 800/320.2 |
| 2011/0190008 A1* | 8/2011 | Eronen | G01C 21/20 455/456.3 |
| 2014/0028440 A1 | 1/2014 | Takeuchi et al. | |
| 2015/0217449 A1* | 8/2015 | Meier | B25J 9/1602 700/257 |
| 2015/0235161 A1* | 8/2015 | Azar | G06Q 10/063114 705/7.15 |

* cited by examiner

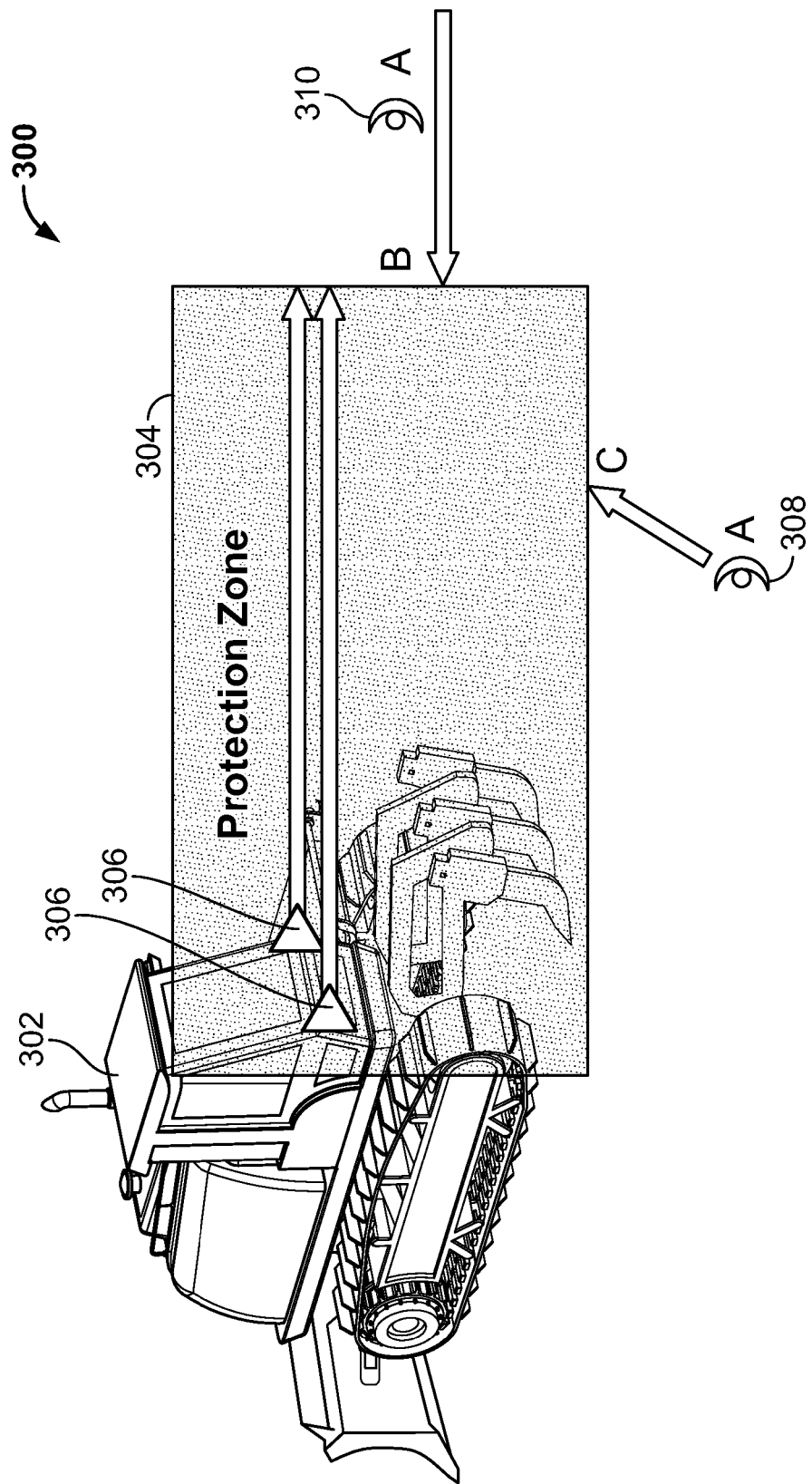

BLUETOOTH ZONE CONTROL USING PROXIMITY DETECTION

FIELD

The present disclosure generally relates to Bluetooth communications and networks, including zone and function control using Bluetooth proximity detection.

BACKGROUND

This section provides background information related to the present disclosure which is not necessarily prior art.

Bluetooth is a wireless technology standard that may be used to transfer data over short distances using short-wavelength ultrahigh frequency (UHF) radio waves in the ISM (Industrial Scientific and Medical) band from 2.4 Gigahertz (GHz) to 2.485 GHz. Bluetooth low energy (BLE) is a related technology for providing communications with reduced power consumption. Separately, in some instances, machines may need to be enabled or disabled when a machine operator is within a certain distance from the machine.

SUMMARY

This section provides a general summary of the disclosure, and is not a comprehensive disclosure of its full scope or all of its features.

According to various aspects, exemplary embodiments are disclosed of a Bluetooth zone control system. In an exemplary embodiment, a Bluetooth zone control system generally includes a first Bluetooth device configured to provide a first Bluetooth signal. A location of the first Bluetooth device corresponds to a location of a machine. The system also includes an operator control unit having a second Bluetooth device configured to detect the first Bluetooth signal. The operator control unit is configured to control the machine based on first authorization rights when the second Bluetooth device detects the first Bluetooth signal at or above a signal threshold, and to control the machine based on second authorization rights when the second Bluetooth device does not detect the first Bluetooth signal at or above the signal threshold.

In another exemplary embodiment, a Bluetooth zone control device generally includes an operator control unit configured to control a machine based on authorization rights for the machine. The Bluetooth zone control device also includes a Bluetooth device coupled to the operator control unit and configured to detect a Bluetooth signal for the machine. The Bluetooth signal for the machine corresponds to a location of the machine. The operator control unit is configured to allow a user possessing the operator control unit to control the machine based on the authorization rights. The authorization rights are based on a location of the operator control unit relative to the machine as detected by the Bluetooth device.

According to yet another exemplary embodiment, a Bluetooth zone control system generally includes a controller configured to control a machine. The system also includes at least one machine Bluetooth device configured to provide a first Bluetooth signal. A location of the machine Bluetooth device corresponds to a location of the machine. The first Bluetooth signal defines a zone relative to the machine. The system also includes at least one operator control unit (OCU) including an OCU Bluetooth device. The controller is configured to inhibit motion of the machine when the at least one asset Bluetooth device is substantially within the zone defined relative to the machine.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3 is a diagram of yet another example embodiment of a Bluetooth zone control system for inhibiting motion of a machine when a person and/or an asset is within a zone.

DETAILED DESCRIPTION

Example embodiments will now be described more fully with reference to the accompanying drawings.

The inventor has recognized that where machines may be required to be enabled or disabled when an operator of the machine is within a certain distance of the machine, Bluetooth signals may be used to determine proximity of the machine operator to the machine based on the presence or absence of a signal and/or the use of signal strength, which may be determined by a control condition.

In some example embodiments, a machine operator may carry control equipment for one or more machines. The control equipment may have a Bluetooth device configured to communicate with other Bluetooth device(s) placed around critical machine or geographic locations. Coded communications may be enabled between Bluetooth devices as a means of identification (e.g., identifying a specific machine, a specific operator's control equipment, etc.). Signal levels and/or time of flight may be used to determine proximity of one or more Bluetooth devices (e.g., corresponding to a proximity of the machine operator to one or more machines, etc.). Control conditions (e.g., enabling or disabling control of one or more machines, etc.) may be implemented according to pre-determined criteria (e.g., proximity distance thresholds, etc.).

Some of the example embodiments described herein may allow for lower cost zone control using Bluetooth signals. Use of Bluetooth low energy (BLE) may allow for rapid communication. Remote BLE devices may be battery powered with longer battery life, which may make installation easier. Coded transmissions may allow for specific zones to be identified and for each zone to have differing control criteria.

According to one example embodiment of the present disclosure, a Bluetooth zone control system includes a first Bluetooth device configured to provide a first Bluetooth signal. A location of the first Bluetooth device corresponds to a location of a machine. The system also includes an operator control unit (OCU) having a second Bluetooth device configured to detect the first Bluetooth signal. The operator control unit is configured to control the machine based on first authorization rights when the second Bluetooth device detects the first Bluetooth signal at or above a signal threshold, and to control the machine based on second authorization rights when the second Bluetooth device does not detect the first Bluetooth signal at or above the signal threshold.

Figure 1:
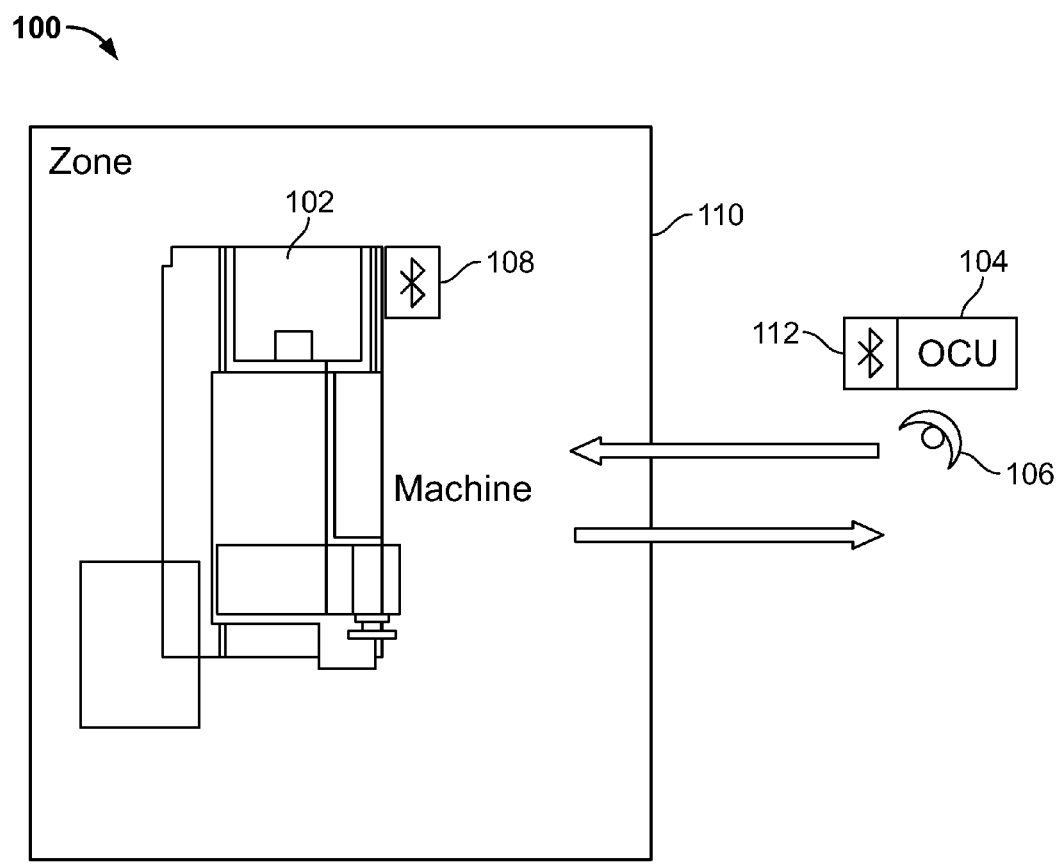
FIG. 1 is a diagram of an example embodiment of a Bluetooth zone control system according to aspects of the present disclosure.

FIG. 1 illustrates an example Bluetooth zone control system 100 according to some aspects of the present disclosure. The system includes a machine 102. The machine 102 may be any suitable machine capable of being operated by an operator control unit, such as, for example, manufacturing equipment, assembly line equipment, press and stamping machines, cranes, hoists, vehicles, rail maintenance of way machinery, packaging equipment, testing equipment, etc. Although only one machine 102 is illustrated in the system 100 of FIG. 1, other systems may include more than one machine and/or may include different machines and/or some substantially similar machines.

The machine 102 may be controlled by an operator control unit 104, which may allow a user 106 (e.g., machine operator, etc.) to wirelessly control the machine 102. The operator control unit 104 may be any suitable control unit, such as, for example, wireless control equipment, a microcontroller, a programmable logic controller (PLC), etc. The operator control unit 104 may communicate with and/or control the machine 102 using any suitable communication and/or control protocols, such as, for example, Bluetooth, RF signals, WiFi wireless signals, TCP/IP, etc.

The operator control unit 104 may allow the user 106 to control the machine 102 based on defined authorization rights. The authorization rights may specify what control actions the user 106 is permitted to use for the machine 102, and may include, without limitation, powering the machine 102 on or off, starting operation of the machine 102, stopping operation of the machine 102, changing operation of the machine 102 (e.g., increasing or decreasing speed, selecting a different mode of operation, changing the number of actions performed, enabling some functions, disabling some functions, etc.), controlling movement of the machine 102, etc. In some embodiments, the user 106 may carry the operator control unit 104 during performance of work tasks, and may use the operator control unit 104 to control one or more machines while the user 106 is within or without the defined Bluetooth zone(s).

The machine 102 may include a first Bluetooth device 108. The first Bluetooth device 108 may be part of the machine (e.g., integrated in a machine 102 controller, communication interface, etc.), may be coupled to the machine electronically (e.g., a Bluetooth device connected to machine 102 by a wire, wirelessly, etc.), may be coupled to the machine 102 physically (e.g., attached to machine 102, mounted on the machine 102), etc. Alternatively, or in addition, the first Bluetooth device 108 may be placed near the machine 102 or in some location corresponding to a location of the machine 102. The first Bluetooth device 108 may be any suitable Bluetooth device, capable of sending and/or receiving Bluetooth signals. In some embodiments, the first Bluetooth device 108 may include at least one of a conventional Bluetooth radio beacon and a Bluetooth low energy (BLE) radio beacon.

The first Bluetooth device 108 may be configured to define a zone 110 around the machine 102. The zone 110 may be defined by a Bluetooth signal output from the first Bluetooth device 108. The zone 110 may be defined by adjusting the power of the first Bluetooth device 108, to adjust its signal strength. The zone 110 may be configured to suit a specific application. For example, the zone 110 may be configured to define a zone perimeter about a desired distance from the machine 102 for which machine operators should be able to control the machine 102. Although the zone 110 is illustrated as rectangular in FIG. 1, other zone perimeter shapes (e.g., circular, etc.) may be used in other exemplary embodiments without departing from the scope of the present disclosure.

The operator control unit 104 includes a second Bluetooth device 112. The operator control unit 104 may be configured to communicate with the first Bluetooth device 108, or may be configured only to receive and/or detect Bluetooth signals provided by the first Bluetooth device 108. The first and second Bluetooth devices 108, 112 may be any suitable Bluetooth modules (broadly, instances, which may include chipsets, devices, etc.) capable of transmitting (broadly, sending) and/or receiving Bluetooth communication signals. The Bluetooth communications may involve standard Bluetooth protocols, Bluetooth low energy (BLE), etc.

As the user 106 approaches the machine 102 while carrying the operator control unit 104, the second Bluetooth device 112 may detect a signal strength and/or time of flight of the signal from the first Bluetooth device 108. The operator control unit 104 may determine the user 106 has entered the zone 110 after (e.g., once, immediately after, etc.) the signal from the first Bluetooth device 108 is detected at or above a signal threshold (e.g., control criteria, etc.). For example, the operator control unit 104 may determine the user 106 has entered the zone 110 after the signal from the first Bluetooth device 108 is first detected. Alternatively, the signal threshold may be based on a percentage of full signal strength (e.g., the user 106 is determined to have entered the zone 110 when the signal from the first Bluetooth device 108 is at least 50% of the full signal strength, etc.). As another option, the signal threshold may be based on a time of flight of the signal form the first Bluetooth device 108 (e.g., the time of flight of the signal is less than or equal to 100 milliseconds (ms), etc.).

After the operator control unit 104 determines the user 106 has entered the zone 110, the operator control unit 104 may grant authorization rights (e.g., first authorization rights, control rights, etc.) for controlling the machine 102 associated with the zone 110. The granting of authorization rights may include granting some control of the machine 102 if the operator control unit 104 didn't previously have any control of the machine 102 when the user 106 was outside the zone 110. For example, the user 106 may not have any authorization rights to a machine 102 through the operator control unit 104 while the user 106 is outside the zone 110 corresponding to the machine 102. After the user 106 enters the zone 110, the user 106 may be allowed to control at least some aspects of the machine 102 by using the operator control unit 104.

Alternatively, if the user 106 already has limited authorization rights for the machine 102 even while outside the zone 110, entering the zone 110 may cause the operator control unit 104 to grant additional rights to the user 106. For example, the user 106 may have some control over a machine 102 (e.g., turning off the machine 102, etc.), even while outside the zone 110, but the user 106 may not be able to control other aspects while outside the zone 110. After the user 106 enters the zone 110, the operator control unit 104 may grant additional rights (e.g., allowing the user to restart operation of the machine 102, adjust movement of the machine 102, etc.).

While the user 106 is inside the zone 110, the operator control unit 104 may check (e.g., continuously, periodically, etc.) to determine whether the user 106 remains in the zone 110. If the user 106 leaves the zone 110, the operator control unit 104 may detect that the user 106 has left the zone 110 based on the signal threshold (e.g., signal strength from the first Bluetooth device 108 has reduced below the signal threshold, time of flight of the signal has increased above the signal threshold, etc.). After the operator control unit 104 has determined the user 106 has left the zone 110, the operator control unit 104 may restrict control of the machine 102 by the user 106 to second authorization rights. For example, the operator control unit 104 may remove all control rights from the user 106, remove only the additional rights granted when the user 106 first entered the zone 110 while leaving initial control rights in place, etc. The authorization rights granted when the user 106 leaves the zone 110 (second authorization rights) may correspond to (e.g., be substantially identical to, etc.) the authorization rights held by the user 106 before the user 106 entered the zone 110.

The zone 110 may be configured to exchange data between the BLE beacons (e.g., first Bluetooth device 108) and the operator control units (e.g., OCU 104). The exchanged data may be used to enable, disable, grant rights, revoke rights, etc., of control (e.g., operation) of the OCU 104, machine under control (e.g., machine 102), etc.

The authorization rights may be pre-defined by the system 100. Alternatively, or in addition, the authorization rights may be dynamically defined. For example, in some embodiments, a configuration server may be used to adjust authorization rights for each operator control unit 104, user 106, and/or machine 102.

Figure 2:
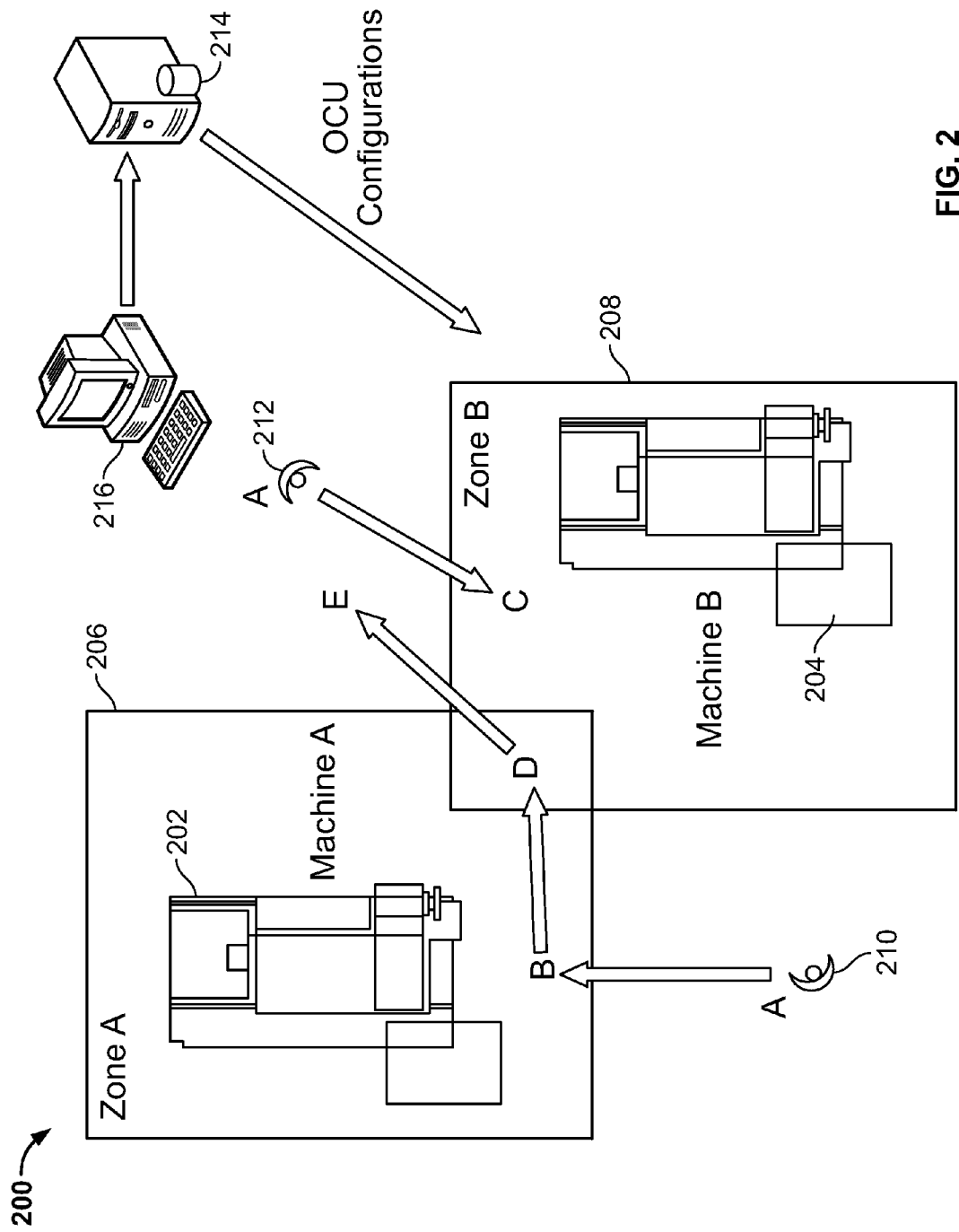
FIG. 2 is a diagram of another example embodiment of a Bluetooth zone control system including multiple machines and corresponding zones according to aspects of the present disclosure.

FIG. 2 illustrates a Bluetooth zone control system 200 having multiple zones and machines, according to another example embodiment. As shown in FIG. 2, the system 200 includes a first machine 202 having a first zone 206, and a second machine 204 having a second zone 208. A first operator 210 carries a first operator control unit (not shown), and a second operator 212 carries a second operator control unit (not shown).

The operator control units may include any operator control units as described herein. The machines 202, 204 may include any machines as described herein, and the zones 206, 208 may be generated using any approaches described herein. For example, first machine 202 (Machine A) may include a first Bluetooth device configured to provide a first Bluetooth signal. The first Bluetooth signal may define a first zone 206 (Zone A) around first machine 202, based on signal strength, time of flight, etc. Similarly, second machine 204 (Machine B) may include a second Bluetooth device configured to provide a second Bluetooth signal. The second Bluetooth signal may define a second zone 208 (Zone B) around second machine 204, based on signal strength, time of flight, etc.

Although two machines are illustrated in FIG. 2, more or less machines may be included in other exemplary embodiments. The machines may be identical to or different from each other. Each machine may be equipped with one or more Bluetooth modules (e.g., conventional Bluetooth radios, BLE radio beacons, etc.). The power of the Bluetooth modules may be set to define a specific zone around each machine (e.g., based on signal strength, time of flight, etc.), and may be configured to suit a specific application. For example, a zone may be defined closely around a machine where an operator normally operates the machine from a very close distance, while a zone may be defined further from the machine if the machine has greater movement during operation and requires an operator to stand back from the machine for safety. The size of a zone may be set according to the type of application and/or specific machine used. For example, control of a small crane or hoist may be enabled when the operator is within approximately a 50 foot radius, whereas control of a press shop crane or mining machine may be inhibited if the operator is within approximately 25 feet.

Each operator 210, 212 possesses an operator control unit (not shown). Each operator control unit may be configured to communicate with Bluetooth devices located at each machine. The operator control unit belonging to operator 210 allows operator 210 to control each machine 204, 206 based on defined authorization rights. For example, the defined authorization rights may indicate an ability for the operator 210 to control and/or access machine 202 and to control and/or access machine 204. The authorization rights for each operator control unit may be the same or different (e.g., operator 210 may have the same or different rights than operator 212). The authorization rights for a single operator control unit may be the same or different regarding different machines (e.g., operator 210 may have the same or different rights for machine 202 as compared to machine 204).

The system 200 includes a central OCU configuration server 214, which may be accessed by authorized users via computing interface 216. The computing interface 216, server 214, and operator control units may be any suitable computing devices having memory (e.g., non-transitory computer readable media, etc.) and one or more processors configured to execute computer readable instructions. Example computing devices include desktop computers, laptop computers, servers, smartphones, tablets, controllers, microcontrollers, programmable logic controllers, etc.

The authorization rights for each operator control unit may be pre-defined, dynamically defined, etc. For example, in some embodiments, the operator control units may be preprogrammed with authorization rights, such that the authorization rights don't change while the operator is working, moving between machines, controlling machines, etc. In order to change the authorization rights, the operator control unit may need to be reprogrammed (e.g., after the operator has finished working for the day, during a break, etc.). In some embodiments, the OCU configuration server 214 may dynamically change authorization rights of an operator control unit, such that they can be changed while an operator is out working with the operator control unit.

In some embodiments, authorization rights and/or permissions of the operator control unit may be configured locally (e.g., at the operator control unit itself, etc.) and/or remotely (e.g., using the OCU configuration server 214, etc.). The operator control unit authorization rights may be total defined rights (e.g., completely allowing access to a machine, preventing access to a machine, etc.) or additional rights (e.g., adding additional control ability to already existing abilities, etc.). For example, in some embodiments, the authorization rights may either allow an operator to control a machine or prevent an operator from controlling a machine. In some embodiments, an operator may always have a first level of control over some aspects of a machine, and the authorization rights may grant additional rights to the operator to have a second level of control over more aspects of the machine.

Authorization rights may be transient (e.g., only lasting for a short time once an operator enters a zone, etc.), or may be permanent (e.g., lasting indefinitely once granted, etc.). The type of authorization rights may be based on the application.

In this example embodiment, operators 210 and 212 start in their respective positions as shown at step A in FIG. 2. Both operators 210 and 212 are outside zones 206 and 208. In this example, the operators each hold identical operator control units, which have the same rights. Machines 202 and 204 each include BLE advertising devices. In this example, there is no requirement to pair the BLE and OCU devices, although pairing may be implemented in other exemplary embodiments.

At step B, operator 210 enters zone 206. The presence of operator 210 (and the operator's OCU) in zone 206 is detected by the operator's OCU. For example, the operator's OCU may detect a signal strength of the BLE device associated with machine 202 as being at or above a threshold, indicating the OCU (and operator 210 carrying the OCU) are inside zone 206.

The operator control unit then permits additional rights based on its proximity to machine 202. For example, operator 210 may have additional rights to control machine 202 (e.g., starting and stopping machine 202, adjusting movement of machine 202, etc.) through the operator control unit, which operator 210 did not have when the operator 210 was outside zone 206.

At step C, operator 212 enters zone 208. The presence of operator 212 (and the operator's OCU) in zone 208 is detected by the operator's OCU. For example, the operator's OCU may detect a signal strength of the BLE device associated with machine 204 as being at or above a threshold, indicating the OCU (and operator 212 carrying the OCU) are inside zone 208.

Because operator 212 is detected as entering zone 208, the operator control unit permits additional rights to operator 212 for machine 204 based on the proximity of the OCU (and therefore operator 212) to machine 204. For example, operator 212 may have additional rights to control machine 204 through the OCU, which operator 212 did not have before entering zone 208.

Because operator 210 remains in zone 206 at step C, operator 210 retains the same control rights for machine 202, but does not gain any additional rights to machine 204 based on operator 212 entering zone 208. Thus, each operator's OCU may grant control rights only based on the location of the operator in a specific zone or zones, and may not grant any control rights based on the location of other operators and/or operator control units located in other zones.

At step D, operator 210 enters zone 208, while also remaining in zone 206. The presence of operator 210 in both zone 206 and zone 208 is detected by the operator control unit of operator 210. The OCU then permits additional rights based on the proximity of operator 210 to machine 202 and machine 204. For example, the OCU may simply grant the control rights normally permitted when an operator is in zone 206, and also grant the control rights normally permitted when an operator is in zone 208. Alternatively, or in addition, the OCU may grant special authorization rights that are only permitted when an operator is located simultaneously in zone 206 and zone 208. For example, an operator may be able to control machines 202 and 204 in coordinated movement while located in both zones 206 and 208.

Because operator 212 remains located in zone 208 at step D, operator 212 retains the same authorization rights for machine 204, but does not gain any additional rights for machine 202 or 204 based on operator 210 moving into zone 208. Thus, each operator's OCU may not grant any additional control rights when another operator enters the same zone. Alternatively, a first operator's OCU could grant control rights based on another operator entering and/or leaving the same and/or different zone as the first operator.

At step E, operator 210 leaves zones 206 and 208. The lack of presence of operator 210 in zones 206 and 208 is detected by the operator control unit of operator 210. The OCU then revokes the control rights of operator 210 that were permitted when the operator 210 entered zones 206 and 208. For example, upon leaving zones 206 and 208, the OCU may no longer allow operator 210 to control machines 202 or 204. Because operator 212 still remains in zone 208 when operator 210 leaves zones 206 and 208, operator 212 retains the same rights to machine 204.

FIG. 3 illustrates a Bluetooth zone control system 300 having a machine and a protection zone according to yet another example embodiment. As shown in FIG. 3, the system 300 includes a machine 302 having a zone 304 (the Protection Zone). An operator 310 carries an operator control unit (not shown), and a worker 308 carries an asset Bluetooth device (not shown) (e.g., a Bluetooth and/or BLE beacon, etc.). An asset Bluetooth device may be configured to indicate its location, and thus a location of a person possessing the asset Bluetooth device, equipment including the asset Bluetooth device, etc. For example, an operator, worker, etc., may carry an asset Bluetooth device. Similarly, an asset Bluetooth device may be included in another machine, fork lift truck, vehicle, a piece of sensitive equipment, etc.

Bluetooth devices 306 are configured to define the zone 304 relative to the machine 302. The Bluetooth devices 306 may define the zone 304 using any suitable Bluetooth signal approach, including those described herein (e.g., Bluetooth signal strength, time of flight, etc.). For example, the Bluetooth devices 306 may include cross verifying Bluetooth and/or BLE beacons. The Bluetooth devices 306 may be included in machine 302 (e.g., attached to the machine, mounted on the machine, etc.). Alternatively, or in addition, the Bluetooth devices 306 may be located remote from the machine 302 (e.g., on a floor near the machine 302, a wall near the machine 302, etc.). Although FIG. 3 illustrates a single machine 302 having two Bluetooth devices 306, other exemplary embodiments may include more than one machine, and each machine may include more or less Bluetooth devices.

The zone 304 may be defined as a protection zone, and may be configured to secure the area around the machine 302 to prevent damage to personnel and/or assets. For example, the zone 304 may be defined to inhibit (e.g., reduce, slow, prevent, etc.) motion of the machine 302 when worker 308 or operator 310 enters the zone 304, thereby preventing injury to worker 308 or operator 310 from contact with the machine 302. As another example, assets (e.g., other machines, sensitive equipment, etc.) could be protected by disabling motion of the machine 302 when an asset enters zone 304, which may occur though movement of the machine 302 and/or movement of the asset.

The Bluetooth devices 306, operator control unit, asset Bluetooth device, etc., may be configured to exchange data between each other and/or other assets. The data may be used to enable, disable, grant rights, revoke rights, etc., of control and/or operation of the machine 302 to an operator control unit and/or the machine 302. For example, an operator control unit may include a controller for controlling the machine 302. After detecting an operator, worker, etc. (e.g., an operator control unit, worker beacon, etc.) and/or other asset in the zone 304, the operator control unit may be prevented from controlling the machine 302. As another example, the machine 302 may include a controller for controlling the machine 302. When an operator, worker, etc. and/or asset enters the zone 304, the controller may be prevented from operating the machine 302 (e.g., an operator driving the machine 302 may be prevented from moving the machine 302 while an operator, worker, etc. and/or asset is within the zone 304, etc.).

In the example embodiment of FIG. 3, operator 310 and worker 308 start in their respective positions at step A in FIG. 3. Both are outside zone 304. In this example, operator 310 possesses an operator control unit configured to control machine 302. Worker 308 possesses a Bluetooth beacon and works in an area near machine 302.

The machine 302 includes Bluetooth devices 306 (e.g., Bluetooth beacons, etc.) defining zone 304. Operator 310 and worker 308 have the same proximity rights (e.g., when either operator 310 or worker 308 enters zone 304, motion of the machine 302 will be substantially inhibited, etc.). The machine 302 can be controlled by operator 310 as long as both operator 310 and worker 308 stay outside the zone 304.

At step B, operator 310 enters zone 304. The Bluetooth devices 306 and/or the OCU of operator 310 detects operator 310 entering zone 304. The motion of the machine 302 is then inhibited via the operator control unit and/or an interface from the Bluetooth devices 306 to the machine 302.

At step C, worker 308 enters zone 304. The Bluetooth devices 306 detect the presence of worker 308 in the zone 304 based on the Bluetooth beacon of worker 308. The machine 302 is still inhibited from moving based on the detected presence of both operator 310 and worker 308 in the zone 304.

If operator 310 were to leave the zone 304, the machine 302 would still be inhibited from moving based on the continued presence of worker 308 in the zone 304. Likewise, if only worker 308 left the zone 304 while operator 310 remained, the machine 302 would still be inhibited from moving based on the continued presence of operator 310 in the zone 304. Only when both worker 308 and operator 310 leave the zone 304 will the machine 302 be allowed to move again, and operator 310 will be able to control the machine 302 again.

In another exemplary embodiment, control rights may be passed to an operator control unit as a transitory effect (e.g., an operator obtains additional rights by entering a zone, but then retains the rights after leaving the zone). An operator may approach a machine and obtains rights to control the machine when entering the zone defined around the machine. These control rights may remain in effect even when the operator leaves the zone. For example, in a rail ballasting application where an operator approaches a ballast wagon and is granted control rights to the wagon, rights to control prior wagons may optionally be revoked when the new rights are granted (e.g., the operator may continue to be able to control prior wagons even after leaving the zones of the prior wagons, an operator may be able to control a wagon after leaving its zone only until entering the zone of a different wagon, etc.).

In an exemplary embodiment, a Bluetooth zone control method generally includes controlling a machine based on first authorization rights when a Bluetooth signal at or above a signal threshold is detected and controlling the machine based on second authorization rights when a Bluetooth signal at or above the signal threshold is not detected. An operator control unit may be used for controlling the machine. The operator control unit may include a Bluetooth device configured to detect a Bluetooth signal at or above a signal threshold. The Bluetooth signal may be provided from another Bluetooth device that is at a location corresponding to a location of the machine.

The exemplary method may include defining a zone relative to the machine by adjusting a power of the Bluetooth signal. The signal threshold may include detecting the Bluetooth signal, a signal strength of the Bluetooth signal, a time of flight of the Bluetooth signal, etc. The method may include permitting or revoking additional control rights in the machine to the operator control unit when the operator control unit enters the zone. Additionally, or alternatively, the method may include permitting or revoking additional control rights in the machine to the operator control unit when the operator control unit leaves the zone.

In another exemplary embodiment, a Bluetooth zone control method generally includes allowing a user possessing an operator control unit to control a machine based on authorization rights. The authorization rights may be based on a location of the operator control unit relative to the machine as detected by a Bluetooth device. The Bluetooth device may be coupled to the operator control unit and configured to detect a Bluetooth signal for the machine that corresponds to a location of the machine.

The method may include defining a zone around the machine by providing the Bluetooth signal using a Bluetooth low energy beacon. The method may include permitting or inhibiting control of the machine when the operator is within a proximity distance from the machine, and permitting or inhibiting control of the machine when the operator is beyond a proximity distance from the machine.

In a further exemplary embodiment, a Bluetooth zone control system generally includes inhibiting motion of a machine when at least one asset Bluetooth device indicates its location as being substantially within a zone defined relative to the machine. The machine may be controlled by a controller. At least one machine Bluetooth device may be configured to provide a Bluetooth signal that defines the zone relative to the machine.

The method may include detecting the presence of a first asset Bluetooth device and a second asset Bluetooth device, and inhibiting motion of the machine when either or both of the first and second asset Bluetooth devices are within the zone. Motion of the machine may be inhibited using an operator control unit and/or an interface from the machine Bluetooth device to a controller of the machine.

Exemplary embodiments of Bluetooth zone control systems, devices, and methods are disclosed herein that may provide one or more (but not necessarily any or all) of the following advantages. Exemplary Bluetooth zone control systems may prevent damage to personnel and/or other assets by inhibiting motion of machines and/or other equipment while personnel/assets are near the machines/equipment (within a zone). Operators may be inhibited from operating machines and/or equipment unless the operator is sufficiently close to the machine (within a zone), which may prevent accidental unintended operation of machines/equipment. The zone control systems may be implemented efficiently, automatically, with lower power using BLE, etc., to increase safety and protection for personnel/assets.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purposes of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A Bluetooth zone control system comprising:
a first Bluetooth device configured to provide a first Bluetooth signal, a location of the first Bluetooth device corresponding to a location of a machine; and
an operator control unit including a second Bluetooth device configured to detect the first Bluetooth signal, the operator control unit configured to control the machine based on first authorization rights when the second Bluetooth device detects the first Bluetooth signal at or above a signal threshold, and to control the machine based on second authorization rights when the second Bluetooth device does not detect the first Bluetooth signal at or above the signal threshold.

2. The system of claim 1, wherein the machine includes the first Bluetooth device, and the first Bluetooth signal provided by the first Bluetooth device defines a zone around the machine.

3. The system of claim 2, wherein the zone is defined by adjusting a power of the first Bluetooth signal provided by the first Bluetooth device.

4. The system of claim 1, wherein the signal threshold includes at least one of detecting the first Bluetooth signal provided by the first Bluetooth device, a signal strength of the first Bluetooth signal, and a time of flight of the first Bluetooth signal.

5. The system of claim 1, wherein the operator control unit is configured to permit a user in possession of the operator control unit to control the machine based on the first authorization rights when the user is within a proximity distance of the machine, the proximity distance corresponding to detection of the first Bluetooth signal at or above the signal threshold.

6. The system of claim 1, wherein the first authorization rights include allowing control of the machine using the operator control unit, and the second authorization rights include inhibiting control of the machine using the operator control unit.

7. The system of claim 1, wherein:
the machine is a first machine;
the system further comprises a third Bluetooth device configured to provide a second Bluetooth signal, a location of the third Bluetooth device corresponding to a location of a second machine; and
the second Bluetooth device of the operator control unit is configured to detect the second Bluetooth signal, the operator control unit configured to control the second machine based on third authorization rights when the second Bluetooth device detects the second Bluetooth signal at or above the signal threshold, and to control the second machine based on fourth authorization rights when the second Bluetooth device does not detect the second Bluetooth signal at or above the signal threshold.

8. The system of claim 7, wherein the operator control unit is configured to control both the first and second machines based on fifth authorization rights when the second Bluetooth device of the operator control unit detects both the first Bluetooth signal and the second Bluetooth signal at or above the signal threshold.

9. The system of claim 1, further comprising a configuration server configured to adjust the first and second authorization rights.

10. A Bluetooth zone control device comprising:
an operator control unit configured to control a machine based on authorization rights for the machine; and
a Bluetooth device coupled to the operator control unit and configured to detect a Bluetooth signal for the machine, the Bluetooth signal for the machine corresponding to a location of the machine;
wherein the operator control unit is configured to allow a user possessing the operator control unit to control the machine based on the authorization rights, the authorization rights based on a location of the operator control unit relative to the machine as detected by the Bluetooth device.

11. The device of claim 10, wherein the Bluetooth signal for the machine is provided by a Bluetooth low energy device coupled to the machine, and the Bluetooth signal defines a zone around the machine.

12. The device of claim 10, wherein the location of the operator control unit relative to the machine is determined by the Bluetooth device detecting the Bluetooth signal at or above a signal threshold, the signal threshold based on a specified signal strength and/or a time of flight of the Bluetooth signal.

13. The device of claim 10, wherein:
the authorization rights include allowing control of the machine using the operator control unit when the operator control unit is within a proximity distance threshold of the machine; and
the authorization rights include inhibiting control of the machine using the operator control unit when the operator control unit is outside of the proximity distance threshold of the machine.

14. The device of claim 10, wherein:
the machine is a first machine, the Bluetooth signal is a first Bluetooth signal for the first machine, and the authorization rights are first authorization rights;
the operator control unit is configured to control a second machine based on second authorization rights for the machine;
the Bluetooth device of the operator control unit is configured to detect a second Bluetooth signal for the second machine, the second Bluetooth signal for the second machine corresponding to a location of the second machine; and
the operator control unit is configured to allow a user possessing the operator control unit to control the second machine based on the second authorization rights, the second authorization rights based on a location of the operator control unit relative to the second machine as detected by the Bluetooth device.

15. A Bluetooth zone control system comprising:
a controller configured to control a machine;
at least one machine Bluetooth device configured to provide a first Bluetooth signal, a location of the machine Bluetooth device corresponding to a location of the machine, the first Bluetooth signal defining a zone relative to the machine; and
at least one asset Bluetooth device;
the controller configured to inhibit motion of the machine when the at least one asset Bluetooth device indicates its location as being substantially within the zone defined relative to the machine.

16. The system of claim 15, wherein:
the at least one machine Bluetooth device includes at least a first machine Bluetooth device and a second machine Bluetooth device;
the machine includes the first and second machine Bluetooth devices; and
the first and second machine Bluetooth devices are configured to define the zone relative to the machine to prevent damage to personnel and/or an asset.

17. The system of claim 16, wherein:
the at least one asset Bluetooth device includes at least a first operator control unit and a second operator control unit; and
wherein the controller is configured to inhibit motion of the machine when at least one of the first operator control unit and the second operator control unit is indicated as being located substantially within the zone.

18. The system of claim 17, wherein the first operator control unit includes the controller, the first operator control unit configured to inhibit motion of the machine when the first operator control unit and/or the at least one machine Bluetooth device detects a presence of the at least one asset Bluetooth device substantially within the zone.

19. The system of claim 15, wherein the at least one machine Bluetooth device is coupled to the controller via an interface, the at least one machine Bluetooth device configured to inhibit motion of the machine when the at least one asset Bluetooth device and/or the at least one machine Bluetooth device detects a presence of the at least one asset Bluetooth device substantially within the zone.

20. The system of claim 15, wherein the zone is defined based on a signal strength and/or a time of flight of the first Bluetooth signal.

* * * * *